United States Patent [19]

Lee

[11] Patent Number: 5,177,646
[45] Date of Patent: Jan. 5, 1993

[54] APPARATUS FOR PREVENTING ACCIDENTAL RECORDING OF A TAPE RECORDER

[75] Inventor: Ju-hyeong Lee, Suwon, Rep. of Korea

[73] Assignee: SamSung Electronics Co., Ltd., Suwon, Rep. of Korea

[21] Appl. No.: 551,469

[22] Filed: Jul. 12, 1990

[30] Foreign Application Priority Data

Jul. 13, 1989 [KR] Rep. of Korea .................. 89-10259

[51] Int. Cl.⁵ ...................... G11B 15/05; G11B 19/04; G11B 23/02
[52] U.S. Cl. ...................................... 360/60; 360/93; 360/132
[58] Field of Search .................. 360/60, 132, 93, 96.5, 360/132

[56] References Cited

U.S. PATENT DOCUMENTS

| | | | |
|---|---|---|---|
| 4,184,180 | 1/1980 | Barton, Jr. et al. | 360/60 |
| 4,506,122 | 3/1985 | Miyata | 360/25 |
| 4,729,047 | 3/1988 | Kanno | 360/60 |
| 4,805,045 | 2/1989 | Schonfeld et al. | 360/60 |

FOREIGN PATENT DOCUMENTS 0193342 12/1983 Japan .

*Primary Examiner*—Stuart S. Levy
*Assistant Examiner*—Jefferson Evans
*Attorney, Agent, or Firm*—Robert E. Bushnell

[57] ABSTRACT

An apparatus for preventing accidental recording of a tape recorder is disclosed. The apparatus detects the presence or absence of the protecting piece of a tape cassette and outputs control signals for discriminating the allowance or prohibition of the recording. The apparatus utilizes a light sensing device without any switching contacts thereby assuring the reliability of the operation.

7 Claims, 3 Drawing Sheets

APPARATUS FOR PREVENTING ACCIDENTAL RECORDING OF A TAPE RECORDER

BACKGROUND OF THE INVENTION

1. Field of the Invention

The present invention relates to an apparatus for preventing accidental recording of a cassette type tape recorder, and particularly to an apparatus for preventing accidental erasure or double recording on a cassette tape of a tape recorder utilizing a reel rotation sensing mechanism which senses rotation of a reel disk.

2. Description of the Background Art

Magnetic recording medium is generally capable of recording and reproducing desired information repeatedly as wanted.

The magnetic recording medium is cut to a predetermined width, wound onto reels, and a tape cassette is made up by installing the reels in a casing. The tape cassette and a tape recorder for driving the tape cassette are provided with a mechanism for preventing accidental recording, i.e., erasure or change of the recorded contents against the user's intention. In more detail, the tape cassette is provided with a removable protecting piece for preventing accidental recording and the tape recorder is provided with a detecting mechanism for checking the presence of the protecting piece to automatically determine the allowance or prohibition of recording.

For example, in the Japanese U.M. Laid Open No. Sho 60-26833, there is disclosed a technique wherein an operating key of the recording mode is pushed down or not pushed down by a detecting member for detecting the presence of the protecting piece of the cassette. However, this technique is not suitable for an apparatus such as a VTR, which is also known as a VCR, in which almost all of the operating keys are of a switch operation type.

Japanese U.M. Laid Open No. Sho 58-193342 and the U.S. Pat. No. 4,506,122 respectively disclose a recording preventing apparatus and a switch thereof wherein a selection switch is activated by a detection lever for detecting the presence of the protecting piece of the tape cassette, and a device for prohibiting the recording mode upon receiving a switching signal from the selection switch. In these techniques, the contacts of the selection switch must be preserved in good condition for assuring operation. But, the contacts of the switch are apt to be deteriorated to cause mis-operating due to sparks initiated by frequent contact and separation, or due to the weakening of contacting force between contacts.

SUMMARY OF THE INVENTION

Accordingly, an object of the present invention is to provide an apparatus for preventing accidental recording which can generate a switching signal without the aid of a contact switch so as to prevent the mis-operation due to the contact deficiency in consideration of the problems encountered in the prior art.

Another object of the present invention is to provide an apparatus for preventing accidental recording which can utilize the conventional reel rotation sensor in a VTR or the like.

To accomplish the above objects, the apparatus according to the present invention comprises:
a base;
a plurality of reel disks rotatably mounted on the base and for placing thereon a tape cassette provided with a removable protecting piece and driven to transport the tape of the tape cassette;
a reel disk rotation sensing device for sensing the state of rotation of the reel disks to output control signals and for controlling the rotation of the reel disks; and
an elongated detection member rotatably mounted on the base, and biased by a spring and having at one end thereof a detecting portion adapted to abut the protecting piece and at the other end thereof a shutter portion, the movement of the shutter portion being detected by the reel disk rotation sensor outputting detecting signals. The detecting signals of the reel disk rotation sensing device vary in response to the movement of the shutter portion and determine allowance or prohibition of recording on the tape.

In the preferred form of the invention, the reel disks may be a supply reel disk or a take up reel disk, and are rotatably set to be driven by a servo-controlled driving mechanism. When the tape cassette is seated on the reel disks, the reel disks are rotated to transport the tape in the cassette forward or backward according to the rotational direction. And the advancing path of the tape varies to direct to the recording and/or reproduction heads according to the operating mode.

The reel disk rotation sensing device for sensing the state of rotation of the reel disks includes a circular reflector attached to the undersurface of the reel disk and having a plurality of light absorbing sections and light reflecting sections which are disposed radially and aternately to one another. The reel disk rotation sensing device further includes a light sensor having a light emitting portion and a light receiving portion and being mounted on the base opposite to the reflector. When the reflector rotates together with the reel disk and a light beam is generated from the light emitting portion of the light sensor, the light beam reflected from the light reflecting sections of the reflector is detected by the light receiving portion of the light sensor to output pulse signal intermittently. As the period of the pulse signal corresponds to the rotational speed of the reel disk, the pulse signal can be used as a control signal for controlling the rotative drive of the reel disk.

Here, the shutter portion of the detection member is disposed to pass between the reflector and the light sensor. As the shutter portion is moved in relation with the detecting portion which abuts the protecting piece of the tape cassette, if the protecting piece remains unremoved, the shutter portion passes once between the reflector and the light sensor upon loading the tape cassette on the reel disk. While, if the protecting piece is removed, the detecting portion moves to the pushed position and then returns to the initial position thereby making the shutter portion pass twice between them. That is, the shutter portion passes once between the reflector and the light sensor and is detected once by the light sensor upon loading the tape cassette with the protecting piece, while it passes twice and is detected twice without the protecting piece.

Therefore, when the tape cassette is loaded, the light sensor detects the shutter portion once or twice to output the detecting signals before detecting the rotation of the reel disk.

As the detecting signals can discriminate the presence of the protecting piece, they can be used as signals for determining the recording mode. For this purpose, the shutter portion is provided with a light absorbing section and a light reflecting section for being detected by the light sensor regardless of initial position of the light sensor which can be directed to the light absorbing portion or the light reflecting portion of the reflector.

The above and other objects, features and advantages of the invention will be more apparent from following detailed descriptions with reference to the attached drawings.

DETAILED DESCRIPTION OF THE INVENTION

Figures 1, 2, 3:
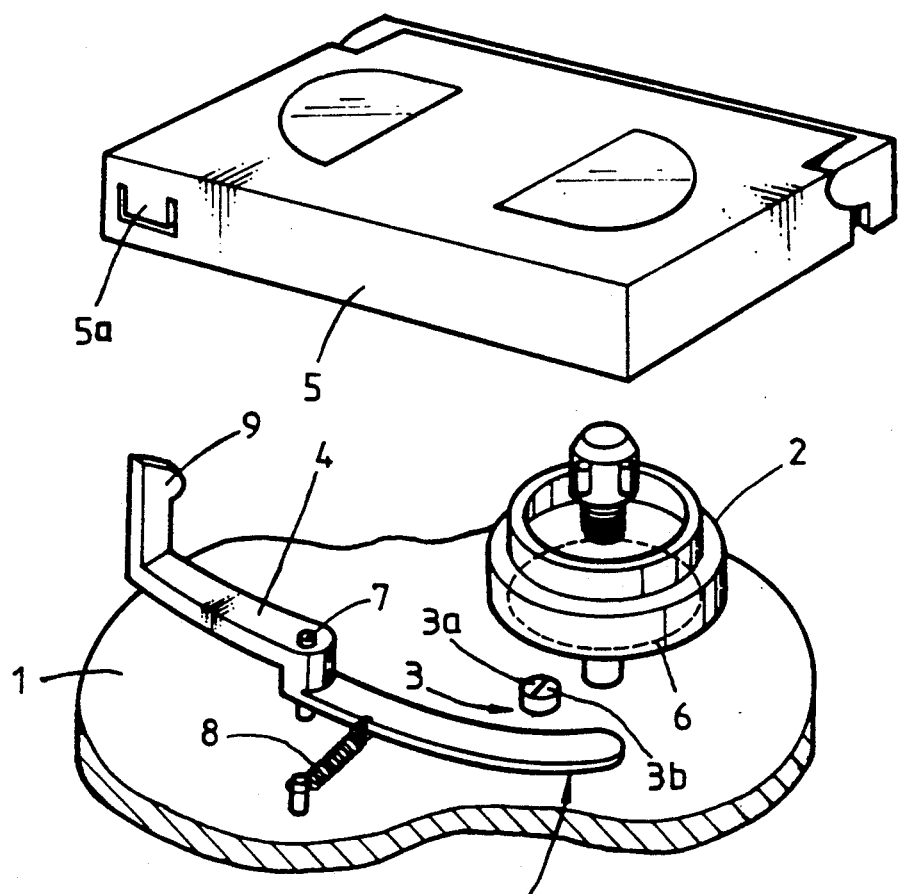
FIG. 1 is an exploded perspective view of an embodiment of the apparatus for preventing accidental recording of the tape recorder in accordance with the present invention.
FIG. 2 is a plan view of a reflector attached to the undersurface of the reel disk in the apparatus of the FIG. 1.
FIG. 3 is a plan view of the shutter portion formed at the detecting member in the apparatus of the FIG. 1.

As illustrated in FIG. 1, an apparatus for preventing accidental recording of a tape recorder according to the present invention comprises a reel disk 2 mounted on the base 1, a light sensor 3 and a detection lever 4.

A reel disk 2 is rotated by a driving mechanism (not shown) and is mounted with a tape cassette 5. A reflecting plate 6 is attached, as illustrated in FIG. 2, onto the undersurface of the reel disk 2. The oblique line section 6a of reflecting plate 6 absorbs light and non-oblique line section 6b reflects light.

A light sensor 3 includes light emitting section 3a and light receiving section 3b and is disposed on the base 1 to face the reflecting plate 6.

A detection lever 4 is provided to be rotated about a shaft 7 which is fixed to the base and rotatably holds the central part of the detection lever. The lever 4 is elastically biased by a spring 8 which is attached to the lever 4 and to the base 1 at each end.

At one end of the detection lever 4, there is provided a detecting portion 9 which is moved between two predetermined positions in dependence of the presence of the protecting piece 5a provided at the front side of the cassette 5. At the other end of the detection lever 4, there is provided a shutter portion 10, as shown in FIG. 3, consisting of the oblique line section 10a and non-oblique line section 10b respectively for absorbing and reflecting the light. The oblique line section 10a and non-oblique line section 10b is formed on the undersurface of the detection lever 4 facing the light sensor 3 so as to form a couple of halves arranged in the longitudinal direction of the lever 4. The shutter portion 10 is positioned between the light sensor 3 and the reflector 6 to move between the right and the left of the light sensor 3 by the rotation of the lever 4. The shutter portion is divided into the oblique line section 10a and non-oblique 10b section in order to have the light sensor operate regardless of the relative position of the reflector with the shutter portion 10. More detailed explanation thereof is provided below.

The detection portion 9 of the detection lever 4 is biased backward on abutting the protection piece 5a of the cassette to rotate the detection lever 4 counterclockwise and thus the shutter portion 10 is moved from the right of the light sensor 3 to the left of the same.

Figure 4A:
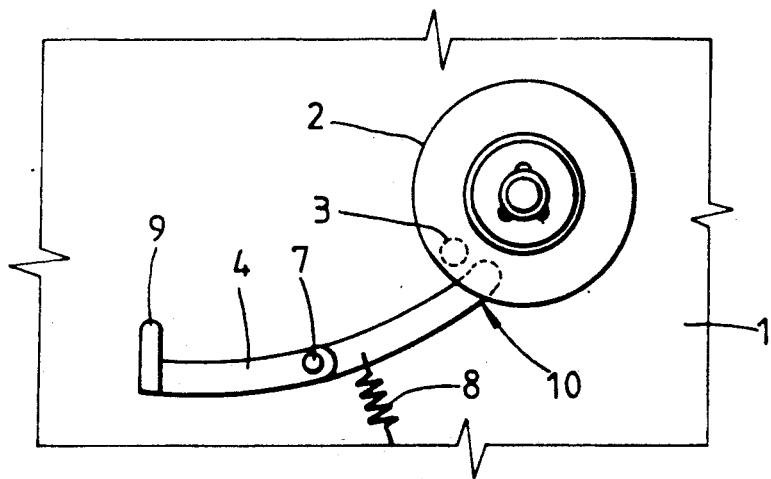
FIG. 4A illustrates the position of the detecting lever before the insertion of the tape cassette.
Figure 4B:
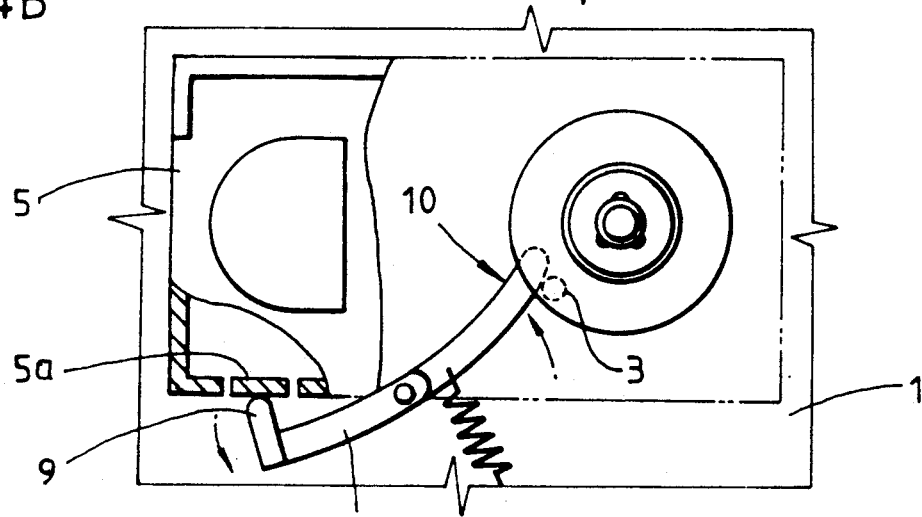
FIG. 4B illustrates the position of the detecting lever after the insertion of the tape cassette having the protection piece for preventing accidental recording.
Figure 4C:
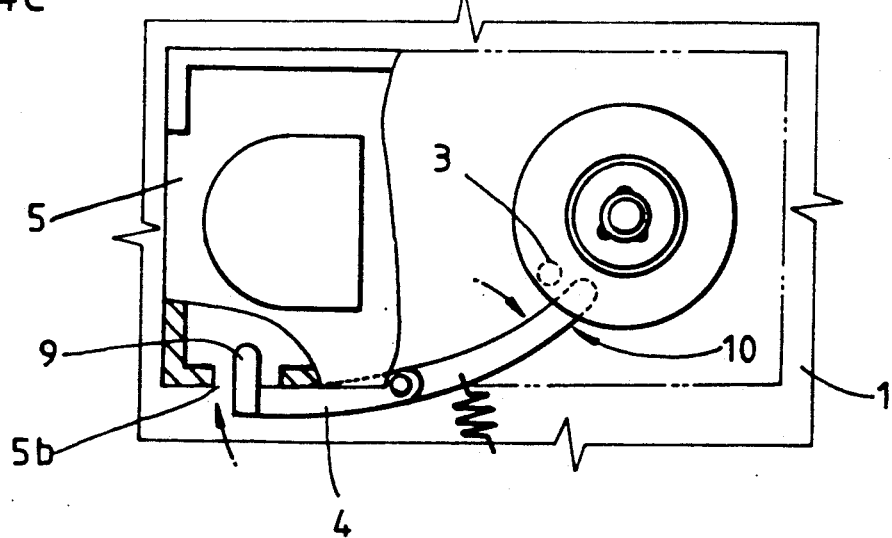
FIG. 4C illustrates the position of the detection lever after the insertion of the tape cassette without the protection piece.
Figure 5A:
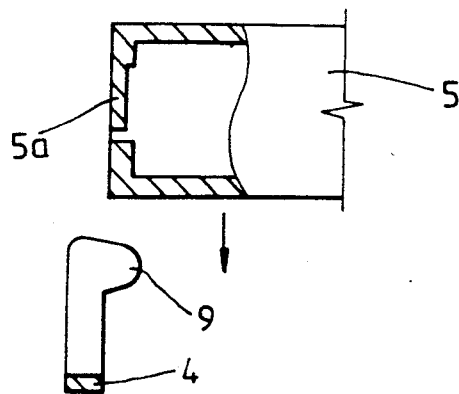
FIGS. 5 A,B,C illustrate insertion processes of the cassette having the protection piece.
Figure 6A:
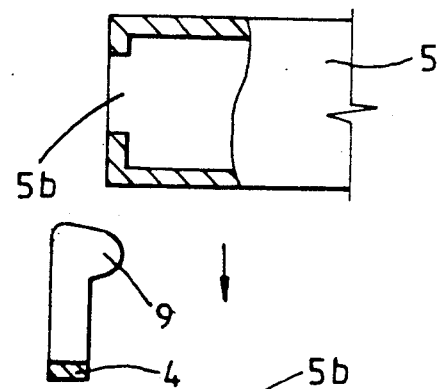
FIGS. 6 A,B,C illustrate insertion processes of the cassette without the protection piece.
Figure 5B:
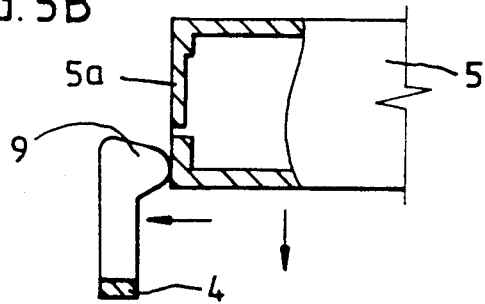
Figure 6B:
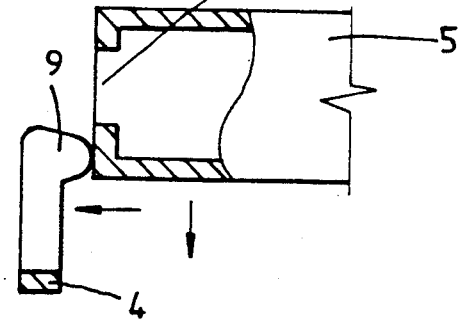
Figure 5C:
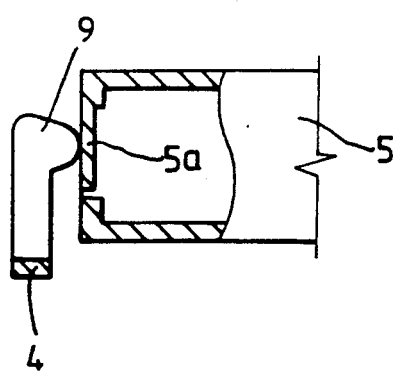
Figure 6C:
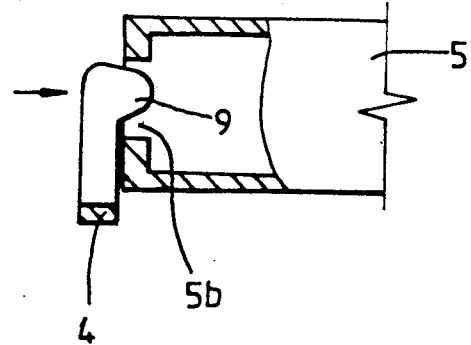

The movement of the detection lever 4 in response to the state of the cassette is described in more detail with reference to FIGS. 4A to 6C. When the cassette is not loaded, the shutter portion 10 of the detection lever 4 is positioned at the right of the light sensor 3 as illustrated in FIG. 4A. As shown in FIGS. 4B and 5A to 5C, the cassette with protection piece 5a is loaded, the detection portion 9 of the detection lever 4 is biased backward to have the lever 4 rotated and accordingly the shutter portion 10 is moved to the left of the light sensor 3 from the original position. On the other hand, as shown in FIGS. 4C and 6A to 6C, if the cassette without the protection piece is loaded, the detection portion 9 is first biased backward and then returns to its initial position on entering thereof into the opening 5b. Accordingly the shutter portion 10 is moved to the left of the light sensor 3 and returns to the initial position, the right of the light sensor 3.

Therefore, when the protecting piece 5a is detected after loading the cassette, the shutter portion 10 is moved from the right to the left so that light beam emitted toward the reflecting plate 6 of the reel disk 2 is to be shut off one time temporarily.

On the other hand, when the protecting piece 5a is not detected after loading the cassette, the shutter portion 10 is first moved from the right to the left of the light sensor 3, then returned to the right or its initial position so that the light beam is shut off two times.

When the shutter portion 10 shuts off the light beam of the light sensor 3 one time or two times as mentioned above and if the light sensor 3 faces the non-oblique line section 6a of the reflecting plate 6, a "low" signal is generated from the light receiving portion, while a "high" signal is outputted when it faces the oblique line portion 6b.

Thus, when the shutter portion 10 is detected one time by the light sensor 3, signal "high" signal (⌐⌐) or single "low" signal (⌐⌐) is outputted. When it is detected two times a double "high" signal (⌐⌐⌐⌐) or double "low" signal (⌐⌐⌐⌐) is outputted.

Since these detecting signals are outputted immediately after the tape cassette is loaded and before the tape recorder is operated, they can be easily discriminated circuitly from the reel rotating sensing signal which is outputted after the outputting of the detecting signals and the allowance of the recording mode can be controlled by the detecting signals.

The following Table 1 shows the initial signal of the light sensor 3 outputted in response to the presence or the absence of the protecting piece 5a, together with the recording modes and the corresponding status of the conventional switch.

TABLE 1

| protecting piece 5a | initial signal of the light sensor | recording modes | conventional switch |
| --- | --- | --- | --- |
| provided | ⎍ or ⎍ | allow | ON |
| removed | ⎍⎍ or ⎍⎍ | prohibit | OFF |

As can be understood from the Table 1, according to the present invention, by using a detection lever and a reel disk rotation sensor, the same detecting signals clearly discriminating the recording mode can be obtained in the manner that they are obtained by the conventional switch.

Particularly, according to the present invention, since the signal is obtained using the the light sensor without contacts, there is no possibility of the accidental misoperation due to the insufficient contacting of the conventional switch and more reliable operation can be obtained.

While the invention has been described in its preferred embodiment, it is to be understood that such description is for illustrative purposes only and that changes and variations may be made without departing from the spirit or scope of the following claims.

What is claimed is:

1. An apparatus for preventing accidental recording of a tape recorder comprising:
   a base;
   reel disks, rotatably mounted on said base, for receiving a tape cassette provided with a removable protecting piece and transporting tape within said tape cassette;
   rotation sensing means for sensing and converting rotation of said reel disks into output control signals for enabling control of said rotation of said reel disks; and
   an elongated detecting member pivotally mounted on said base, biased by a spring, and having at one end thereof a detecting portion adapted to abut said removable protecting piece and at another end thereof a shutter portion, whereby movement of said shutter portion caused by loading of said tape cassette is detected by said reel disk rotation sensing means;
   wherein said output control signals of said rotation sensing means vary in response to the movement of said shutter portion to provide an indication of an existence of said removable protecting piece and selectively enable a recording function in dependence upon said indication.

2. An apparatus for preventing accidental recording of a tape recorder as claimed in claim 1, wherein said reel disk rotation sensing means comprises:
   a light sensor having a light emitting portion and a light receiving portion adapted to emit light to and receive light from an undersurface of at least one of said reel disks;
   a reflector, attached to said undersurface of said at least one of said reel disks, comprising a plurality of light absorbing sections and a plurality of light reflecting sections alternately and radially disposed;
   said shutter portion of said elongated detecting member is provided with an undersurface having a light absorbing section and a light reflecting section arranged in a longitudinal direction of said elongated detecting member, with said shutter portion being positioned between said light sensor and said reflector to move in a first direction according to the movement of said elongated detecting member.

3. An apparatus for preventing accidental recording of a tape recorder comprising:
   a base;
   a plurality of reels rotatably mounted on said base to receive a tape cassette provided with a protecting piece, said reels disposed to be driven to transport a tape of said tape cassette;
   an elongated detecting member rotatably mounted on said base and having at one end thereof a detecting portion biased to abut said protecting piece and at the other end thereof a shutter portion; and
   sensing means for sensing and converting a state of rotation of said reels into output control signals indicating rotation of said reels, movement of said shutter portion caused by loading of said tape cassette being detected and represented by said sensing means as detecting signals varying in response to the movement of said shutter portion to thereby determine the allowance and prohibition of recording upon said tape.

4. An apparatus for preventing accidental recording of a tape recorder as claimed in claim 3, wherein said sensing means comprises:
   a light sensor comprising a light emitting portion and a light receiving portion to emit light to and receive light from an undersurface of one of said reels;
   a reflector attached to the undersurface of said one of said reels and including a plurality of light absorbing sections and light reflecting sections disposed radially and alternately to one another;
   wherein said shutter portion of said elongated detecting member is positioned between said light sensor and said reflector to move from a first position to a second position relative to said light sensor according to the rotation of said elongated detecting member and has an undersurface provided with a light absorbing section and a light reflecting section to form a pattern arranged in a longitudinal direction of said elongated detecting member.

5. An apparatus for preventing accidental recording of a tape recorder as claimed in claim 2, wherein said shutter portion moves in said first direction in front of said sensing means upon insertion of said tape cassette and thereafter moves in an opposite direction in front of said sensing means if said removable protecting piece is not present on said cassette tape.

6. An apparatus for preventing accidental recording of a tape in a tape recorder comprising:
   a base;
   reel disks, rotatably mounted on said base, to receive a tape cassette provided with a region having a write-protecting piece if said tape in said tape cassette can be recorded on or having said write-protecting piece removed if said tape in said tape cassette is not to be recorded on;
   an elongated detecting member pivotally mounted on said base and having a detecting portion adapted to contact said tape cassette in said region of said write-protecting piece, and a shutter portion; and
   reel disk rotation sensing means for detecting said shutter portion a first time and for generating a first pulse, when said detecting portion detects said tape cassette being loaded, to enable said tape recorder to record on said tape, said reel disk rotation sensing means sensing said shutter portion a second time, after said tape cassette has been loaded and if said tape cassette does not have said write-protecting piece, for generating a second pulse to prevent said tape recorder from recording on said tape.

7. An apparatus for preventing accidental recording of said tape in said tape recorder as claimed in claim 6, wherein said reel disk rotation sensing means comprises:
 a light sensor having a light emitting portion and a light receiving portion adapted to emit light to and receive light from an undersurface of at least one of said reel disks; and
 a first reflector, attached to said undersurface of said at least one of said reel disks, comprising a plurality of light absorbing sections and a plurality of light reflecting sections alternately and radially disposed;
wherein said shutter portion comprises: a second reflector, provided on an undersurface of said shutter portion, having a light absorbing section and light reflecting section arranged in a longitudinal direction of said elongated detecting member, said shutter portion being positioned between said light sensor and said first reflector to move in a first direction between said first reflector and said light sensor during loading of said tape cassette and then in an opposite direction if said write-protecting piece has been removed.

* * * * *

UNITED STATES PATENT AND TRADEMARK OFFICE
CERTIFICATE OF CORRECTION

PATENT NO. : 5,177,646
DATED : 5 January 1993
INVENTOR(S) : Ju-Hyeong Lee

It is certified that error appears in the above-indentified patent and that said Letters Patent is hereby corrected as shown below:

Column 2,    Line 32,    change "alternatey" to --alternately--;

Column 4,    Line 2,     change "10b section" to --section 10b--:

Signed and Sealed this

Twenty-ninth Day of July, 1997

Attest:

BRUCE LEHMAN

*Attesting Officer*    *Commissioner of Patents and Trademarks*